United States Patent
Jeong et al.

(10) Patent No.: US 10,562,521 B2
(45) Date of Patent: Feb. 18, 2020

(54) METHOD FOR CONTROLLING HYDRAULIC PRESSURE REFILLING OPERATION FOR ENGINE CLUTCH OF HYBRID ELECTRIC VEHICLE

(71) Applicants: Hyundai Motor Company, Seoul (KR); Kia Motors Corporation, Seoul (KR)

(72) Inventors: Sang Hyun Jeong, Gyeonggi-do (KR); Seung Ki Kong, Gyeonggi-do (KR); Seong Hwan Kim, Gyeonggi-do (KR); Hak Sung Lee, Gyeonggi-do (KR); Dae Won Yang, Gyeonggi-do (KR); Gyeong Cheol Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 206 days.

(21) Appl. No.: 15/723,620

(22) Filed: Oct. 3, 2017

(65) Prior Publication Data

US 2018/0099659 A1 Apr. 12, 2018

(30) Foreign Application Priority Data

Oct. 10, 2016 (KR) .................. 10-2016-0130405

(51) Int. Cl.
*B60W 20/40* (2016.01)
*B60W 20/50* (2016.01)
(Continued)

(52) U.S. Cl.
CPC ............ *B60W 20/40* (2013.01); *B60W 10/02* (2013.01); *B60W 10/08* (2013.01); *B60W 20/10* (2013.01);
(Continued)

(58) Field of Classification Search
None
See application file for complete search history.

(56) References Cited

U.S. PATENT DOCUMENTS

2013/0045833 A1* 2/2013 Okubo .................. B60K 6/387
477/5
2013/0310217 A1* 11/2013 Terakawa ................ B60K 6/48
477/5

(Continued)

FOREIGN PATENT DOCUMENTS

JP 2013-216285 A 10/2013
KR 10-2011-0055294 5/2011
(Continued)

*Primary Examiner* — Rami Khatib
(74) *Attorney, Agent, or Firm* — Mintz Levin Cohn Ferris Glovsky and Popeo, P.C.; Peter F. Corless

(57) ABSTRACT

A method for controlling a hydraulic pressure refilling operation for an engine clutch of a vehicle includes determining whether the vehicle travels using power of a driving motor with an engine clutch maintained in a disengaged state, and upon determining that the vehicle travels using power of the driving motor with the engine clutch maintained in the disengaged state, determining whether loss of hydraulic pressure has occurred, and upon determining that loss of hydraulic pressure has occurred, controlling a hydraulic pressure refilling operation such that working fluid in a reservoir is supplied to the actuator with the engine clutch in an engaged state, and controlling the driving motor so that the driving motor outputs a compensated torque by compensating for an effect of a load torque, generated by a non-operating engine, on a torque of the driving motor.

7 Claims, 4 Drawing Sheets

(51) Int. Cl.
*B60W 20/10* (2016.01)
*B60W 50/032* (2012.01)
*B60W 20/15* (2016.01)
*B60W 10/02* (2006.01)
*B60W 10/08* (2006.01)
*F16D 48/06* (2006.01)
*B60W 50/00* (2006.01)

(52) U.S. Cl.
CPC ............ *B60W 20/15* (2016.01); *B60W 20/50* (2013.01); *B60W 50/032* (2013.01); *F16D 48/066* (2013.01); *B60W 2050/0083* (2013.01); *B60W 2710/021* (2013.01); *B60W 2710/022* (2013.01); *B60W 2710/083* (2013.01); *F16D 2500/1024* (2013.01); *F16D 2500/1026* (2013.01); *F16D 2500/1045* (2013.01); *F16D 2500/1066* (2013.01); *F16D 2500/10412* (2013.01); *F16D 2500/3024* (2013.01); *F16D 2500/3065* (2013.01); *F16D 2500/30814* (2013.01); *F16D 2500/3124* (2013.01); *F16D 2500/508* (2013.01); *F16D 2500/5014* (2013.01); *F16D 2500/70406* (2013.01); *Y10S 903/93* (2013.01)

(56) References Cited

U.S. PATENT DOCUMENTS

2017/0259825 A1\* 9/2017 Okada .................. B60W 10/02
2017/0268587 A1\* 9/2017 Ono ........................ F16D 25/14

FOREIGN PATENT DOCUMENTS

KR 10-2016-0008224 1/2016
KR 10-1655677 B1 9/2016

\* cited by examiner

METHOD FOR CONTROLLING HYDRAULIC PRESSURE REFILLING OPERATION FOR ENGINE CLUTCH OF HYBRID ELECTRIC VEHICLE

CROSS-REFERENCE TO RELATED APPLICATION

This application claims under 35 U.S.C. § 119(a) the benefit of Korean Patent Application No. 10-2016-0130405 filed on Oct. 10, 2016, the entire contents of which are incorporated herein by reference.

BACKGROUND

(a) Technical Field

The present disclosure relates to a method for controlling a hydraulic pressure refilling operation for an engine clutch of a hybrid electric vehicle, more particularly, to a method for controlling a hydraulic pressure refilling operation that is performed when leakage or loss of hydraulic pressure occurs at a hydraulic control actuator for operating the engine clutch of the hybrid electric vehicle.

(b) Description of the Related Art

In accordance with increased demand for improved fuel efficiency of vehicles and stringent regulations on emissions from vehicles in many countries, the demand for environmentally friendly vehicles has increased. In order to meet this demand, hybrid electric vehicles have been developed.

In general, hybrid electric vehicles utilize both an engine and a motor as power sources. Because hybrid electric vehicles are driven by electric energy as well as energy obtained from a fossil fuel, hybrid electric vehicles are environmentally friendly vehicles that achieve reduction of emissions and improvement of fuel efficiency.

FIG. 1 (PRIOR ART) is a view schematically illustrating the construction of a powertrain system for a hybrid electric vehicle, particularly a transmission-mounted electric device (TMED)-type powertrain system, in which a driving motor 3 and a transmission 4 are directly connected to each other.

As shown in FIG. 1, an engine 1 and a driving motor 3, which serve as power sources for a vehicle, are arranged in series, and a transmission 4 is connected to an output side of the driving motor 3 so as to transmit power to a driving shaft of the vehicle while performing gear shifting.

Further, a hybrid starter and generator (HSG) 5, which starts the engine 1 or generates electric power using force transmitted from the engine 1, is connected to the engine 1 so that power can be transmitted therebetween.

In addition, a battery 7, which serves as a power source (an electric power source) for the driving motor 3 and the HSG 5, is connected to the driving motor 3 and the HSG 5 via an inverter 6 so as to be charged or discharged. The inverter 6 converts the direct current of the battery 7 into three-phase alternating current and applies the same to the driving motor 3 and the HSG 5 in order to drive the same.

In addition, an engine clutch 2 is disposed between the engine 1 and the driving motor 3 in order to selectively transmit or interrupt power between the engine 1 and the driving motor 3.

The engine clutch 2 selectively transmits or interrupts power between the engine 1 and the driving motor 3 through an engagement (closing) operation or disengagement (opening) operation thereof, which is performed by a hydraulic control actuator (HCA).

The engine clutch 2 may be classified into a wet engine clutch and a dry engine clutch, and the engagement or disengagement operation thereof is performed by the actuator unit, the operation of which is controlled in response to a control signal from a controller.

In accordance with driving conditions, the hybrid electric vehicle may be driven in various driving modes such as an electric-vehicle (EV) mode, which is a pure electric-vehicle mode using only the power of the driving motor 3, and a hybrid-electric-vehicle (HEV) mode, which uses both the power of the engine 1 and the power of the driving motor 3.

Further, when the vehicle is braking or coasting by inertia, it may be driven in a regenerative-braking mode for charging the battery by collecting the kinetic energy of the vehicle through the motor.

In the regenerative-braking mode, the motor, which receives the kinetic energy of the vehicle, generates electric power and charges the battery, which is connected thereto via the inverter.

The hybrid electric vehicle is driven in the HEV mode or the EV mode by engaging or disengaging the engine clutch in accordance with an acceleration or deceleration intention, which is determined based on the driver's manipulation of the accelerator or the brake pedal, a load, a vehicle speed, a state of charge (SOC) of the battery, and the like.

When the driving mode is switched from the EV mode to the HEV mode, the speed of the engine and the speed of the driving motor are synchronized, and the engine clutch is engaged after the synchronization, whereby torque variation is prevented from occurring in the process of transmitting power between the two different power sources, namely the engine and the driving motor, and consequently, drivability can be secured.

Described in more detail, when the driving mode is switched from the EV mode to the HEV mode, after the engine cranking is performed by the HSG, the speeds of the two opposite ends of the engine clutch, that is, the speed of the engine and the speed of the driving motor, are controlled such that the speed difference therebetween is reduced below a predetermined value, and subsequently, slip control is performed with respect to the engine clutch.

When a predetermined period of time has elapsed since slip control was performed with respect to the engine clutch, it is determined that the speed of the engine and the speed of the driving motor have been synchronized, and subsequently, the engine clutch is switched to a completely engaged mode, thereby completing the conversion into the HEV mode.

A position (a torque transmission start point) at which the friction surfaces (the clutch surfaces) of the two opposite ends of the engine clutch come into contact with each other and the torque transmission is started, that is, a position of a contact point at which the engine clutch starts to be in a slip state, is referred to as a touch point (or a kiss point) of the engine clutch.

In the case of a plug-in hybrid vehicle, the driving mode may be divided into a charge-depleting mode (a CD mode) or a charge-sustaining mode (a CS mode) in accordance with the state of charge of the battery.

The CD mode refers to an EV mode in which the vehicle is driven using only the driving motor using the electric power charged in the battery. The CS mode refers to an HEV mode in which the vehicle is driven by appropriately combining the power of the engine and the power of the driving motor after a certain amount of electric power charged in the battery has been used.

Meanwhile, as an example of the engine clutch, a normally-closed-type dry clutch is known.

However, when the normally-closed-type dry clutch is controlled, there is a problem in that it is difficult to maintain the engine clutch in a disengaged (open) state for a long time period due to the leakage of hydraulic pressure from a central slave cylinder (CSC).

In order to maintain the engine clutch in a disengaged state, the stroke of the central slave cylinder needs to be maintained above a predetermined level. However, if leakage or loss of hydraulic pressure occurs, it is not possible to maintain the stroke at a predetermined level suitable for disengaging the engine clutch.

If the stroke cannot be maintained at a level for disengaging the engine clutch, the engine clutch is engaged (closed), making it impossible to drive the vehicle in a CD mode (an EV mode).

Therefore, in order to prevent a problem resulting from leakage or loss of hydraulic pressure from the central slave cylinder, hydraulic pressure refilling is required.

When leakage or loss of hydraulic pressure occurs at a hydraulic pressure line of the hydraulic control actuator (HCA) for driving the engine clutch, the hydraulic pressure refilling is performed by controlling the operation of the hydraulic control actuator, thereby maintaining the stroke of the concentric slave cylinder.

In order to perform the hydraulic pressure refilling operation for a dry engine clutch, the engine clutch needs to be temporarily engaged. However, in the case in which it is required to maintain the vehicle in a CD mode (an EV mode), in which the engine clutch is constantly maintained in a disengaged state, it is not possible to perform the hydraulic pressure refilling operation.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method for controlling a hydraulic pressure refilling operation for an engine clutch of a hybrid electric vehicle, which enables a hydraulic pressure refilling operation of an actuator for an engine clutch even during a CD driving mode (an EV mode), in which a hybrid electric vehicle travels using only a motor without starting or driving an engine, without switching to other driving modes.

In one aspect, the present disclosure provides a method for controlling a hydraulic pressure refilling operation for an engine clutch of a vehicle (e.g., a hybrid electric vehicle), which includes determining whether a present driving mode of the vehicle is a mode in which the vehicle travels using power of a driving motor with the engine clutch maintained in a disengaged state, upon determining that the vehicle travels using power of the driving motor with the engine clutch maintained in the disengaged state, determining whether loss of hydraulic pressure has occurred based on a state of hydraulic pressure of an actuator for driving the engine clutch, upon determining that loss of hydraulic pressure has occurred, controlling a hydraulic pressure refilling operation such that working fluid in a reservoir is supplied to the actuator with the engine clutch in an engaged state in order to supplement hydraulic pressure, and while the hydraulic pressure refilling operation is controlled in order to supplement hydraulic pressure, controlling the driving motor so that the driving motor outputs a compensated torque by compensating for an effect of a load torque, generated by a non-operating engine, on a torque of the driving motor for driving the vehicle.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
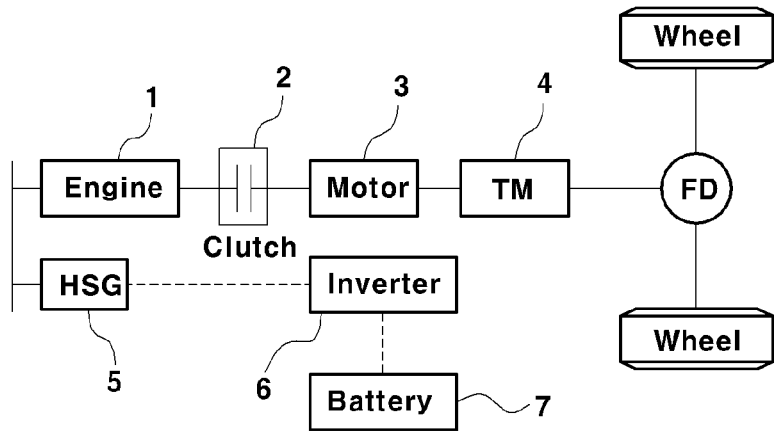
FIG. 1 (PRIOR ART) is a view schematically illustrating the construction of a powertrain system for a conventional hybrid electric vehicle.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The construction of a hydraulic control actuator (HCA) for engaging or disengaging an engine clutch will first be explained for better understanding of the disclosure.

Figure 2:
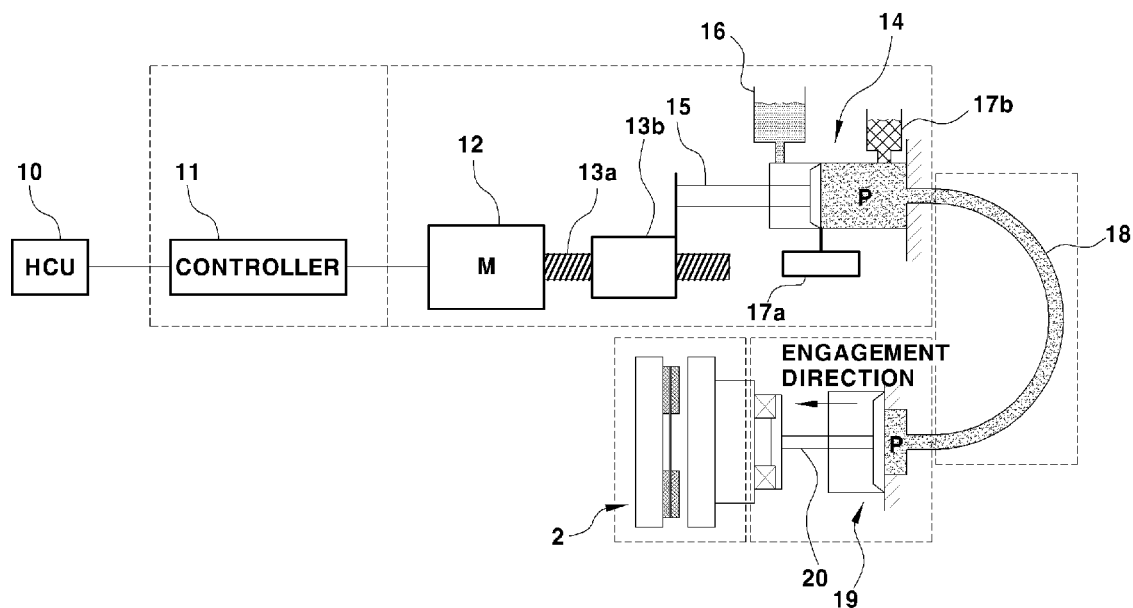
FIG. 2 is a view illustrating the construction of an engine clutch and a hydraulic control actuator (HCA) for driving the engine clutch.

FIG. 2 is a view illustrating the constructions of an engine clutch and a hydraulic control actuator (HCA) for driving the engine clutch. The engine clutch 2 shown in FIG. 2 may be a normally-closed-type dry engine clutch.

As shown in the drawing, the hydraulic control actuator (HCA) includes a controller 11, a motor 12 having a screw shaft 13a, a master cylinder 14, and a concentric slave cylinder (CSC) 19.

The hydraulic control actuator makes the engine clutch 2 engaged (closed) or disengaged (open) by controlling the pressure P of a working fluid. In response to a control command from a hybrid control unit (HCU) 10, which is a high-level controller, the controller 11 of the actuator controls the operation of the motor 12 of the actuator.

When the motor 12 is driven, the rotational movement of the screw shaft 13a, which is a rotating shaft of the motor, is converted into rectilinear movement of a lead screw 13b, which is engaged with the screw shaft 13a. Accordingly, the lead screw 13b moves forward or backward, and a piston 15 of the master cylinder 14, which is coupled to the lead screw 13b, also moves forward or backward together with the lead screw 13b.

Consequently, the position of the piston 15 in the forward-and-backward direction is controlled in response to the control command. As the piston 15 moves forward or backward to a desired position in response to the control command, the pressure P of the working fluid (the hydraulic pressure of the actuator) that is supplied to the engine clutch 2 is controlled.

A reservoir 16 for storing the working fluid is connected to the master cylinder 14. Further, sensors, such as a travel sensor 17a for detecting the stroke position of the piston 15 in the forward-and-backward direction and a pressure sensor 17b for detecting the pressure P of the working fluid, are mounted to the master cylinder 14.

The hydraulic control actuator (HCA) includes a concentric slave cylinder (CSC) 19, which receives the pressure P of the working fluid from the master cylinder 14 and applies force to the engine clutch 2. A fluid pipe 18, which is filled with the working fluid to transmit the pressure P of the working fluid, connects the master cylinder 14 to the concentric slave cylinder 19.

Therefore, when the pressure P of the working fluid is applied to a piston 20 of the concentric slave cylinder 19 through the fluid pipe 18, the piston 20 of the concentric slave cylinder 19 is moved forward or backward. As such, the position of the piston 20 in the forward-and-backward direction is controlled, and accordingly, the engagement or disengagement operation of the engine clutch 2 is achieved.

Meanwhile, when leakage or loss of the hydraulic pressure occurs at the fluid pipe 18 of the hydraulic control actuator, it is required to perform a refilling operation by supplying the working fluid stored in the reservoir 16 through the master cylinder 14.

To this end, the master cylinder 14 is provided with an orifice (not shown) for supplying the working fluid therethrough, and the reservoir 16 is connected to the orifice.

Figure 3:
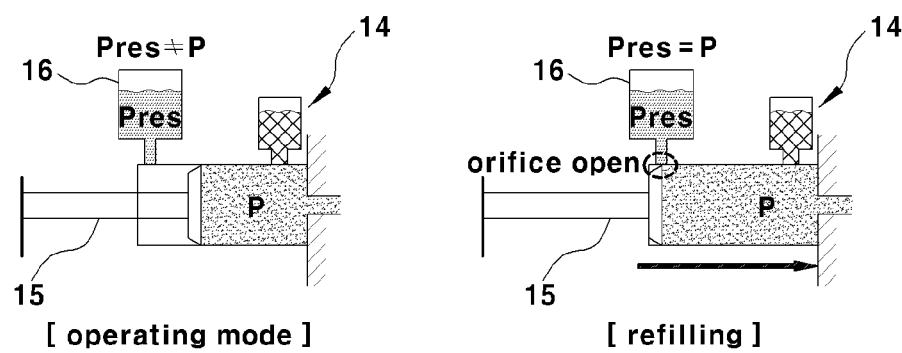
FIG. 3 is a view for explaining the hydraulic pressure refilling operation of a the hydraulic control actuator (HCA) of FIG. 3.

FIG. 3 illustrates views for explaining the hydraulic pressure refilling operation of a hydraulic control actuator (HCA) for the engine clutch. The left drawing in FIG. 3 shows the operational state for driving the engine clutch, and the right drawing in FIG. 3 shows the operational state for performing the hydraulic pressure refilling operation.

As shown in FIG. 3, in order to perform the hydraulic pressure refilling operation, the piston 15 of the master cylinder 14 needs to move backward. The controller 11 moves the piston 15 of the master cylinder 14 backward by controlling the operation of the motor 12 of the actuator.

Accordingly, the orifice of the master cylinder 14 is opened and the space in the master cylinder communicates with the reservoir 16, whereby the working fluid stored in the reservoir 16 is supplied to the master cylinder 14 through the orifice. In this way, the hydraulic pressure refilling operation is achieved.

As such, while the hydraulic pressure refilling operation is controlled, the piston 15 of the master cylinder 14 needs to move backward to a position (for example, a backward limit position) that opens the orifice. Therefore, the hydraulic pressure applied from the master cylinder to the concentric slave cylinder 19 is released.

That is, during the hydraulic pressure refilling operation, because of the backward movement of the piston 15 of the master cylinder 14, the pressure P of the working fluid, by which the engine clutch 2 has been maintained in an open state, is not transferred from the master cylinder 14 to the concentric slave cylinder 19, whereby the normally-closed-type clutch is switched to an engaged (closed) state.

Therefore, even when the hydraulic pressure refilling is required, it is not possible to perform the hydraulic pressure refilling operation in a CD mode (an EV mode), in which the engine clutch 2 needs to be maintained in a disengaged state, and it is possible to perform the hydraulic pressure refilling operation only in a CS mode (an HEV mode), in which the engine clutch 2 is maintained in an engaged state.

Therefore, there is a need to develop a technology that enables the hydraulic pressure refilling operation of the actuator for the engine clutch even during a CD driving mode (an EV mode), in which the hybrid electric vehicle travels using only the motor without starting or driving the engine, without switching to other driving modes.

Hereinafter, a control method according to the present disclosure for solving the above problem will be described.

Figure 4:
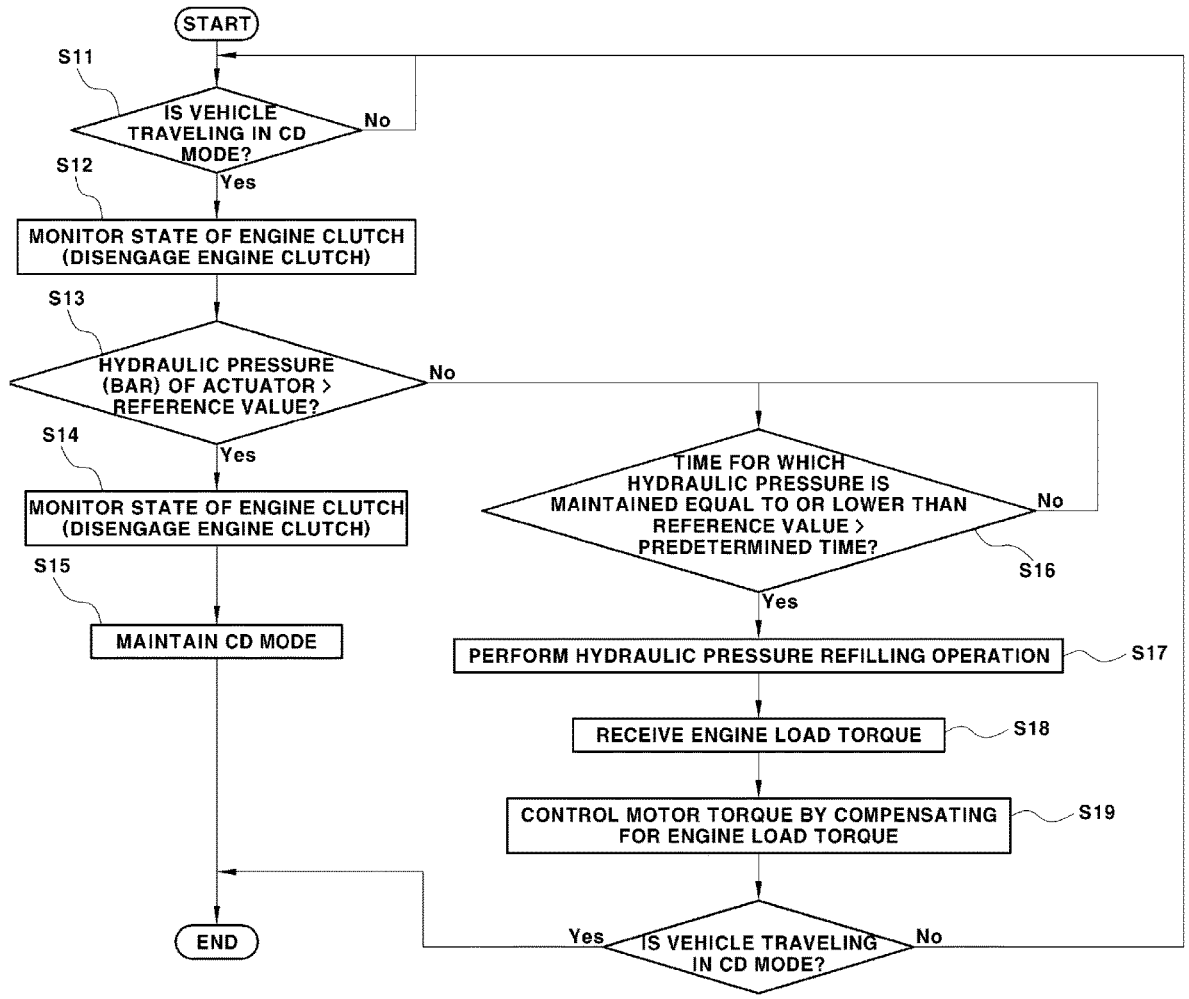
FIG. 4 is a flowchart showing a method for controlling the hydraulic pressure refilling operation according to an embodiment of the present disclosure.
Figure 5:
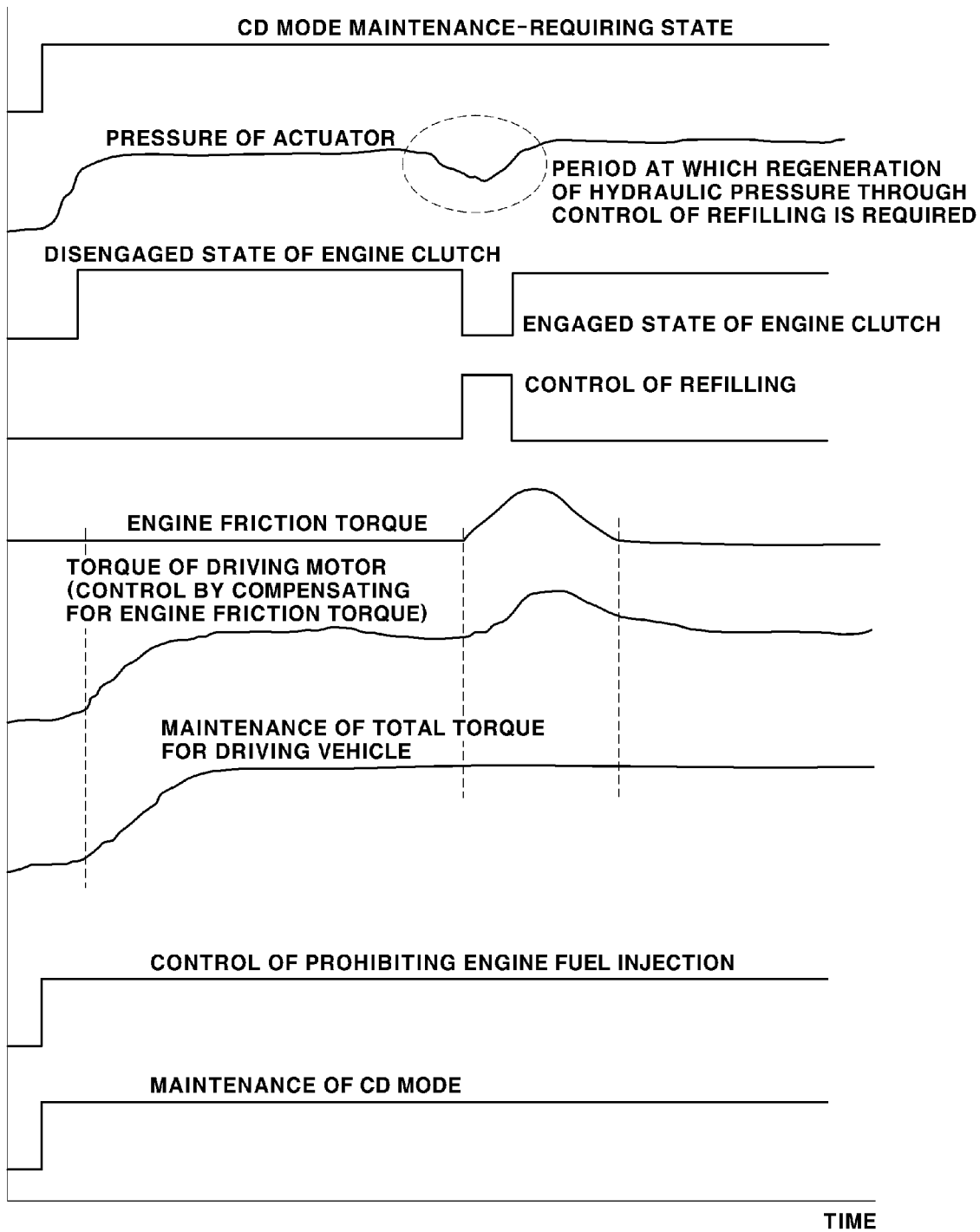
FIG. 5 is a timing chart when the hydraulic pressure refilling operation according to the embodiment of the present disclosure is controlled.

FIG. 4 is a flowchart showing a method for controlling the hydraulic pressure refilling operation according to an embodiment of the present disclosure. FIG. 5 is a timing chart when the hydraulic pressure refilling operation according to the embodiment of the present disclosure is controlled.

The control processes described hereinbelow may be performed by a singularity or plurality of controllers mounted to the hybrid electric vehicle. The controllers may be well-known controllers that are mounted to a common hybrid electric vehicle.

For example, because the control processes according to the present disclosure include a process of controlling the operation of the motor, the hybrid control unit (HCU), which is a high-level controller, may perform control in cooperation with a motor control unit (MCU) and a control unit for controlling the hydraulic control actuator.

Alternatively, the control processes according to the present disclosure may be performed by a single controller, that is, one integrated controller. In the following description, a plurality of controllers may be generally referred to as a controller, or one integrated controller for performing various functions may be referred to as a controller.

Further, in the following description, a CD mode may be substituted by an EV mode, and a CS mode may be substituted by an HEV mode.

First, the controller determines whether the present vehicle driving mode is a CD mode maintenance-requiring state in accordance with a driving condition, that is, whether the vehicle is driven in a CD mode, in which the vehicle travels using only the power of the driving motor 3 (see FIG. 1) with the engine clutch maintained in a disengaged (open) state (S11).

Subsequently, the controller monitors the state of the engine clutch while the vehicle travels in the CD mode (S12).

During the CD mode, the engine clutch is maintained in a disengaged (open) state. In order to maintain the engine clutch in a disengaged state, the pressure P of the working fluid, that is, the hydraulic pressure of the actuator (the HCA pressure), which is generated in the master cylinder 14 by the forward movement of the piston 15, is transferred to the concentric slave cylinder (CSC) 19.

Therefore, as shown in FIG. 5, during the CD mode (EV mode) maintenance-requiring state and during the maintenance of the CD mode state, in order to maintain the disengaged (open) state of the engine clutch, the hydraulic pressure of the actuator (the HCA pressure) is in a state of being increased by pressurization due to the forward movement of the piston 15.

Of course, because the engine is not driven in this state, the engine is controlled such that fuel injection is prohibited from the point of time at which the CD mode is started (see FIG. 5).

Subsequently, the controller compares the hydraulic pressure of the actuator (the HCA pressure) (bar), which is detected by the pressure sensor 17b of the hydraulic control actuator and is monitored by the controller, with a predetermined reference value (S13). If the hydraulic pressure of the actuator is larger than the reference value, hydraulic pressure refilling is not required. Therefore, the controller maintains the CD mode (the EV mode) state (S15) while monitoring the state of the engine clutch (S14).

Meanwhile, upon determining that leakage or loss of the hydraulic pressure has occurred in the hydraulic pressure line, such as the fluid pipe 18 of the hydraulic control actuator (HCA), that is, upon determining that the hydraulic pressure of the actuator detected by the pressure sensor 17b is less than or equal to the reference value, the controller controls the hydraulic pressure refilling operation (S17).

Preferably, the controller may be set to determine that leakage or loss of the hydraulic pressure, which requires hydraulic pressure refilling, has occurred when the hydraulic pressure of the actuator detected by the pressure sensor 17b is maintained equal to or lower than the reference value over a predetermined period of time (S16).

In the hydraulic pressure refilling operation, the controller controls the hydraulic control actuator (HCA) in the same way as a conventional refilling operation. The controller outputs a control signal for moving the piston 15 backward to a position that can open the orifice of the master cylinder 14, and the operation of the motor 12 of the hydraulic control actuator is controlled in response to this control signal.

As such, if the piston 15 is moved backward by the operation of the motor 1 and the orifice of the master cylinder 14 is therefore opened, the working fluid in the reservoir 16 is supplied to the space in the master cylinder through the orifice, whereby the hydraulic pressure refilling operation is performed.

As described above, the hydraulic pressure refilling operation of the hydraulic control actuator (HCA) is controlled in the manner of controlling the operation of the motor 12 so that the piston 15 of the master cylinder 14 is moved to a position that can open the orifice.

During the above-described hydraulic pressure refilling operation, because the piston 15 of the master cylinder 14 needs to move backward to a position that can open the orifice, the engine clutch 2 is switched to an engaged (closed) state, as shown in FIG. 5.

The controller receives information about a load torque generated by the engine (S18), and controls the operation of the driving motor so as to satisfy a torque that is required in order to drive the vehicle during the control of the hydraulic pressure refilling operation, that is, a driver's requested torque, by compensating for the effect of a load torque on a motor torque (S19).

As described above, the engine clutch is maintained in the engaged state during the hydraulic pressure refilling operation. If the engine clutch is engaged when fuel injection or engine driving is not requested, the engine acts as a load on the driving motor.

Therefore, when the vehicle travels in the CD mode, in order to maintain the total torque required to drive the vehicle while constantly satisfying the driver's requested torque during the hydraulic pressure refilling operation, the driving motor needs to output additional torque in an amount equal to an engine friction torque, which acts as a load torque when fuel injection or engine driving is not requested.

As such, in order to produce the total torque required to drive the vehicle while satisfying the driver's requested torque during the hydraulic pressure refilling operation, the driving motor is required to output a torque that is compensated for a load torque generated by the non-operating engine, that is, an engine friction torque.

Therefore, the controller generates a torque command, which is compensated by adding the engine friction torque to a motor torque command for satisfying the driver's requested torque during the hydraulic pressure refilling operation, and the torque output of the driving motor is controlled in response to the compensated torque command during the hydraulic pressure refilling operation.

In conclusion, as shown in FIG. 5, even when the engine clutch is switched to an engaged (closed) state while the hydraulic pressure refilling operation of the actuator is controlled, the torque output from the driving motor is increased in order to satisfy the total requested torque (the driver's requested torque) for driving the vehicle, and accordingly, it is possible to perform the hydraulic pressure refilling operation even during the CD mode while enabling the vehicle to be driven or to travel as the driver requests.

As is apparent from the above description, the present disclosure provides a method for controlling a hydraulic pressure refilling operation for an engine clutch of a hybrid electric vehicle, in which the operation of a motor is controlled so as to output a torque that is compensated for a load torque, which is generated by an engine during a hydraulic pressure refilling operation with an engine clutch in an engaged state, thereby making it possible to perform a hydraulic pressure refilling operation of an actuator for the engine clutch even during a CD driving mode (an EV mode) while maintaining the traveling state of the vehicle as a driver requests.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for controlling a hydraulic pressure refilling operation for an engine clutch of a vehicle, the method comprising:
    determining whether a present driving mode of the vehicle is a mode in which the vehicle travels using power of a driving motor with the engine clutch maintained in a disengaged state;
    upon determining that the vehicle travels using power of the driving motor with the engine clutch maintained in the disengaged state, determining whether loss of hydraulic pressure has occurred based on a state of hydraulic pressure of an actuator for driving the engine clutch;
    transmitting, by an operation of a motor of the actuator, the engine clutch from the disengaged state to an engaged state upon determining that loss of hydraulic pressure has occurred, and then controlling a hydraulic pressure refilling operation such that working fluid in a reservoir is supplied to the actuator with the engine clutch in the engaged state in order to supplement hydraulic pressure; and
    while the hydraulic pressure refilling operation is controlled in order to supplement hydraulic pressure in a state that the vehicle travels using power of the driving motor with the engine clutch maintained in the engaged state, controlling the driving motor so that the driving motor outputs a compensated torque by compensating for an effect of a load torque, the load torque being generated by a non-operating engine, on a torque of the driving motor for driving the vehicle.

2. The method of claim 1, wherein the mode in which the vehicle travels using power of the driving motor with the engine clutch maintained in the disengaged state is a charge-depleting mode or an electric vehicle mode of a hybrid electric vehicle.

3. The method of claim 1, wherein determining whether loss of hydraulic pressure has occurred includes:
    comparing hydraulic pressure of the actuator, detected by a pressure sensor, with a reference value; and
    if the hydraulic pressure of the actuator is less than or equal to the reference value, determining that loss of hydraulic pressure has occurred.

4. The method of claim 3, wherein, when the hydraulic pressure of the actuator is maintained equal to or lower than the reference value over a predetermined period of time, it is determined that loss of hydraulic pressure has occurred.

5. The method of claim 1, wherein controlling the driving motor while the hydraulic pressure refilling operation is controlled includes controlling the driving motor so that the driving motor outputs a compensated torque by compensating for an effect of an engine friction torque, acting as the load torque, on a torque of the driving motor.

6. The method of claim 1, wherein the engine clutch is a normally-closed-type engine clutch.

7. The method of claim 1, wherein controlling the hydraulic pressure refilling operation includes moving a piston of a master cylinder for generating hydraulic pressure in the actuator backward to a position for opening an orifice of the master cylinder that is connected to the reservoir so that the working fluid in the reservoir is supplied to the master cylinder through the orifice.

* * * * *